F. W. BARHOFF.
METHOD OF AND MEANS FOR SEALING STORAGE BATTERY CONNECTORS AND POSTS.
APPLICATION FILED APR. 7, 1919.
1,328,357.  Patented Jan. 20, 1920.
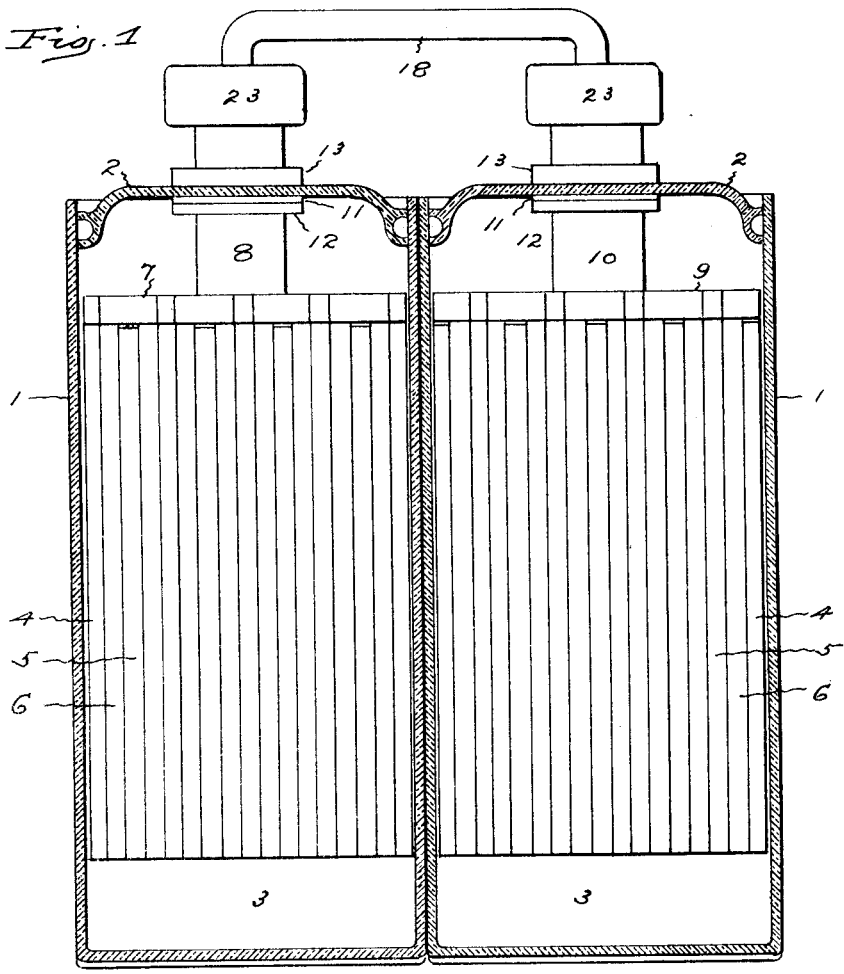
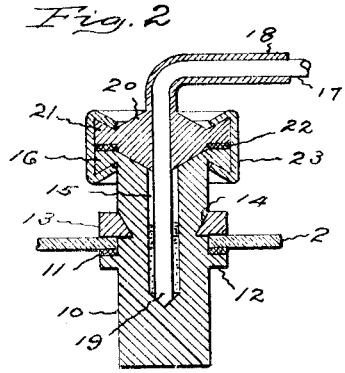
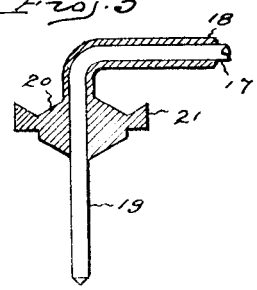
Inventor:
Fred W. Barhoff
by Harry R. Williams
atty.

UNITED STATES PATENT OFFICE.

FRED W. BARHOFF, OF HARTFORD, CONNECTICUT, ASSIGNOR TO THE HARTFORD STORAGE BATTERY MANUFACTURING COMPANY, OF HARTFORD, CONNECTICUT, A CORPORATION OF CONNECTICUT.

METHOD OF AND MEANS FOR SEALING STORAGE-BATTERY CONNECTORS AND POSTS.

1,328,357.  Specification of Letters Patent.  Patented Jan. 20, 1920.

Application filed April 7, 1919. Serial No. 288,096.

*To all whom it may concern:*

Be it known that I, FRED W. BARHOFF, a citizen of the United States, residing at Hartford, in the county of Hartford and State of Connecticut, have invented a new and useful Improvement in Methods of and Means for Sealing Storage-Battery Connectors and Posts, of which the following is a specification.

This invention relates to the means employed for connecting the positive terminal post of one storage battery cell with the negative terminal post of an adjacent storage battery cell.

Owing to the action of the sulfuric acid of the electrolyte of a storage battery, it has been found impracticable to make suitable and efficient joints between the connectors and the terminal posts by threading the parts and screwing them together. Therefore, it is customary to fuse or lead-burn and thus make substantially integral or permanent joints between the connectors and posts, and when such permanent connections are made the parts can only be disassembled, when it becomes necessary to take down the battery for cleaning or repairing, by melting the metal of the parts which have been fused together.

The object of this invention is to provide a method of and means for making such joints between the connectors and terminal posts as will insure efficient and lasting electrical and mechanical connection between the parts, and will permit the parts to be readily separated without the application of heat or without destruction or injury to the posts and connectors when it is desired to clean or repair the battery.

In attaining this end the lead alloy terminal posts are chambered downward from their upper ends and provided with external flanges at their tops, and the lead covered copper conductors which form the connectors are provided with flanges and terminal contacts, the contacts of the connectors being thrust into the chambers of the posts and the flanges of the connectors being bound to the flanges of the posts by metallic binding strips which are folded about the parts in such manner as to tightly close the chambers and force the terminal contact ends of the connectors into close engagement with the posts.

In the accompanying drawings Figure 1 shows a side elevation of two adjacent storage battery cells with the jars in vertical section, illustrating the terminal posts joined by a connector made according to this invention. Fig. 2 shows a vertical section of a terminal post and the end of a connector fastened together by the improved method. Fig. 3 shows a vertical section of one end of the connector.

The cells 1 are made of rubber in the usual form with covers 2 and projecting ribs 3 at the bottom for supporting the elements which comprise the ordinary positive plates 4, negative plates 5 and separators 6. The positive plates of one cell are attached to the lead alloy strap 7 formed integral with the lead alloy post 8, and the negative plates of the other cell are attached to the lead alloy strap 9 formed integral with the lead alloy post 10 in the common manner. The posts project upwardly through the covers and are sealed therein by any suitable means, desirably as shown—by forcing the covers down upon gaskets 11 laid on collars 12 that are integral with the posts, by means of compressible metallic rings 13 that are squeezed into wedge-shaped grooves 14 in the posts above the tops of the covers.

Each post is provided with a chamber 15 that extends downwardly from the upper end and each post has an outwardly extending flange 16 about its top, which flange is desirably undercut so as to make it widest at its outer edge.

The connector has a central core 17 of copper and a lead sheath 18 incasing the copper conductor. The ends of the connector are turned downward and the terminals 19 of the conductor are left unsheathed so they will pass into and make metallic contact with the walls of the chambers in the posts. On each downwardly turned branch of the connector is a lead hub 20 which is designed to close the mouth of the chamber in the post, and about the hub is a flange 21 that is widest at its outer edge.

In order to make connection between the positive and negative posts, the downturned ends of the connector are inserted into the chambers in the posts with the hubs closing the mouths of the chambers. A packing gasket 22 of rubber or other suitable material is placed between the flanges at the top of the post and about the hub and then a band 23 of lead or other suitable material is forced about the flanges and folded over their edges so as to bind the parts together. If desired, mercury may be placed in the chambers in the posts to insure good electrical connection between the copper conductors of the connector and the posts. When it is desired to disconnect the posts, all that is necessary is to unfold the bands that bind the flanges of the connector and posts together. This method insures an efficient electrical and strong mechanical connection between the parts, eliminating the formation of screw threads and obviating the employment of any solder or sealing compound which must be melted in order to release the parts.

The invention claimed is:—

1. In a storage battery, the combination of terminal posts, a connector adapted to electrically join the posts, and pliable metallic bands folded about outwardly extending parts of the posts and connector and rigidly securing them together.

2. In a storage battery, the combination of chambered terminal posts, a connector having conductor terminals extending into and making contact with the walls of the chambers in the posts, and pliable metallic bands folded about outwardly extending parts of the posts and conductors and rigidly securing them together.

3. In a storage battery, the combination of chambered terminal posts with outwardly extending flanges, a connector having conducting terminals extending into and making contact with the walls of the chambers in the posts and flanges closing said chambers, and pliable metal bands folded about the flanges on the posts and connector and securing the parts together electrically and mechanically.

FRED W. BARHOFF.